Oct. 17, 1933.    A. T. MOBLEY    1,931,353
SEED PLANTER
Filed March 5, 1932    3 Sheets-Sheet 1
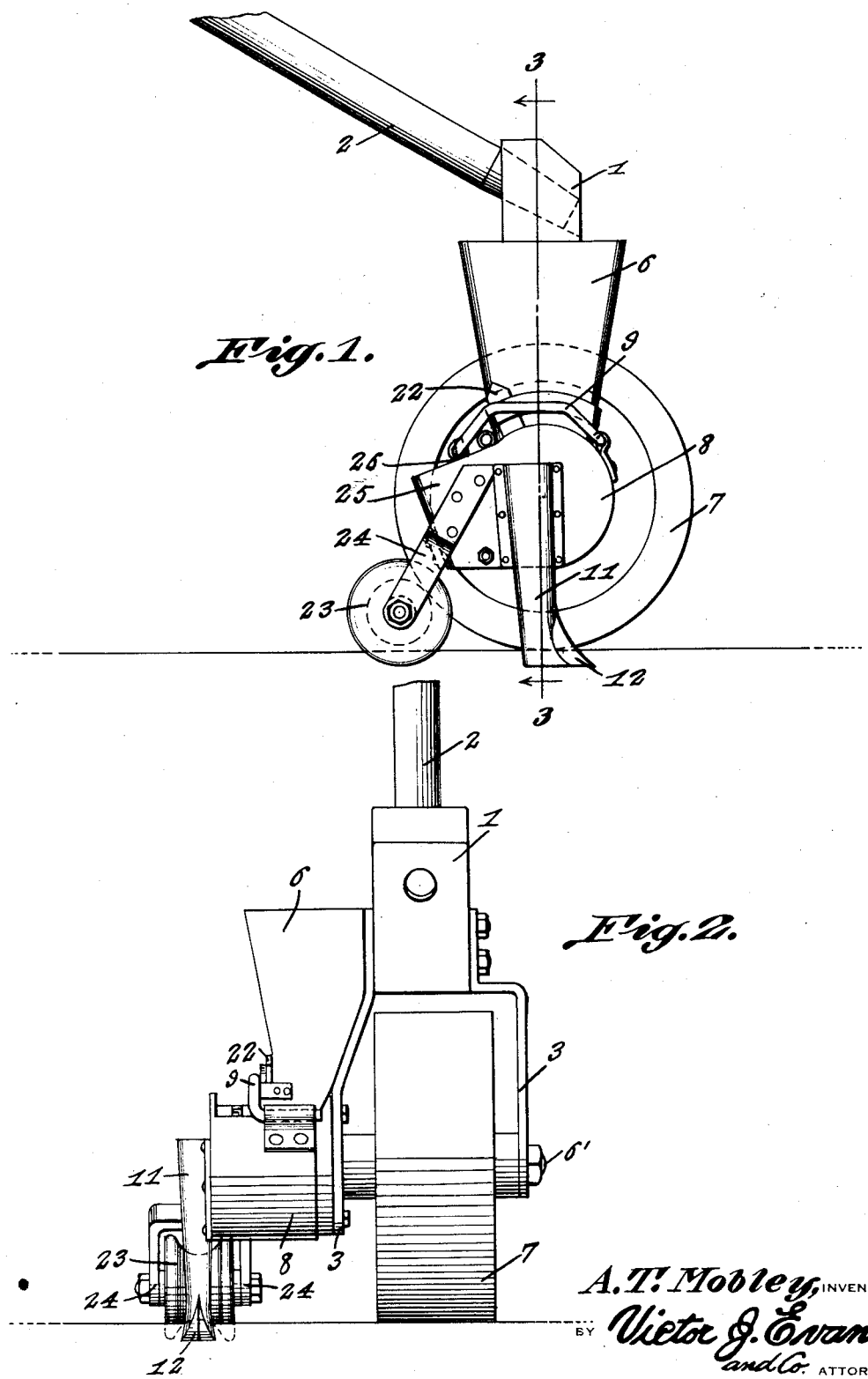

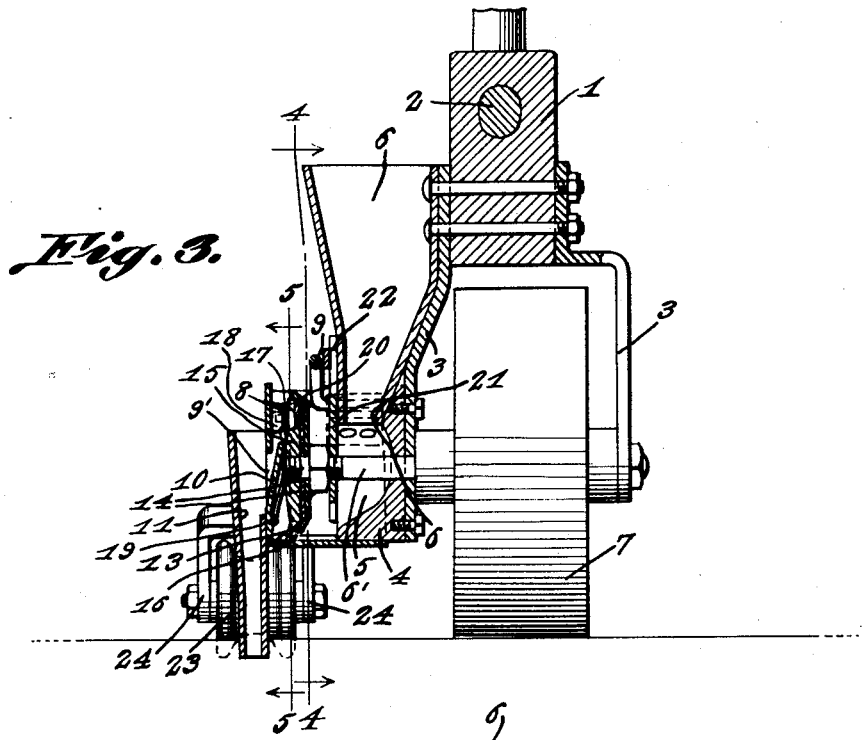
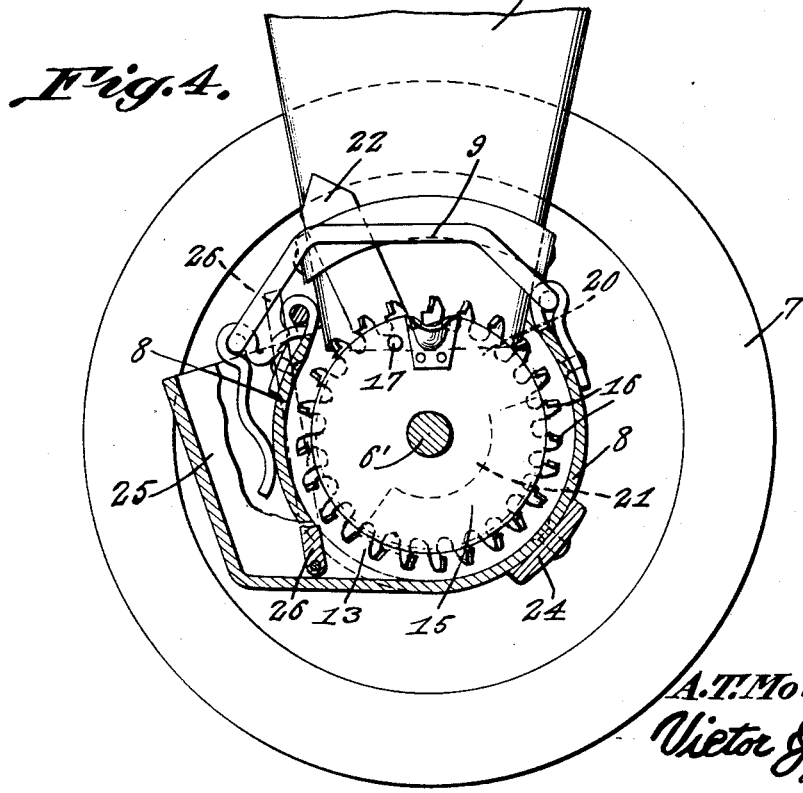

Oct. 17, 1933.  A. T. MOBLEY  1,931,353
SEED PLANTER
Filed March 5, 1932   3 Sheets-Sheet 3
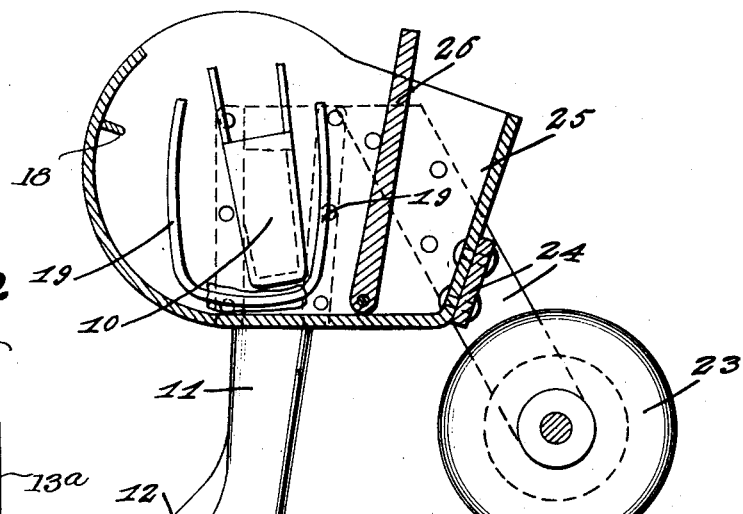
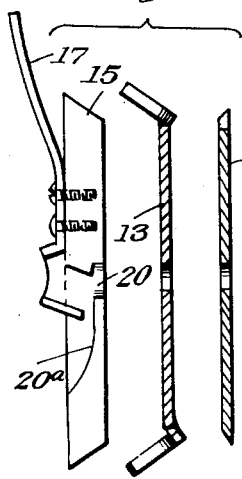
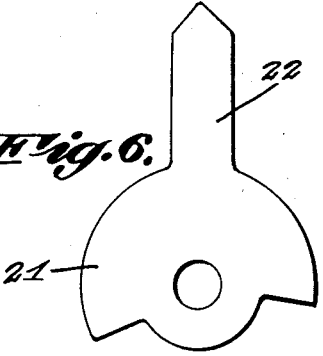
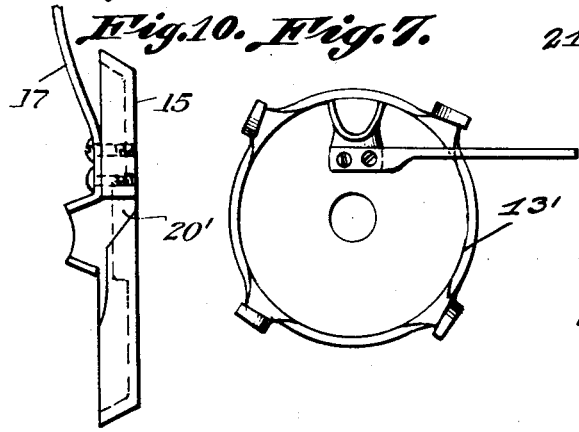
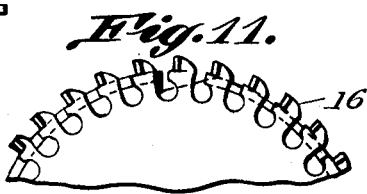
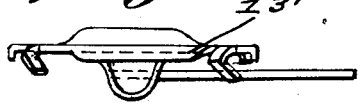

Patented Oct. 17, 1933

1,931,353

UNITED STATES PATENT OFFICE 1,931,353

SEED PLANTER

Arthur T. Mobley, Springfield, Mo.

Application March 5, 1932. Serial No. 597,058

3 Claims. (Cl. 221—135)

This invention relates to a seed planter which is more particularly adapted for greenhouse use, but which, of course, may be used in other places.

The general object of the invention is to provide a toothed wheel and a disk so associated therewith that pockets are formed for picking up the seeds and raising them during the rotary movement of the wheel so that they will be discharged through a notch in the disk, from which they will pass through a spout or the like into a furrow, whereby the seeds are dropped at spaced intervals and by providing wheels with differently spaced teeth thereon, the spacing of the seeds in the furrow can be regulated and the device used for planting seeds of various sizes and different varieties.

Another object of the invention is to provide the device with a ground wheel which rotates the toothed wheel and adjustable means for controlling the feed of seed from a hopper to the casing in which the wheel and disk are located.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the device.

Figure 2 is a front view thereof.

Figure 3 is a section on line 3—3 of Figure 1.

Figure 4 is a section on line 4—4 of Figure 3.

Figure 5 is a section on line 5—5 of Figure 3.

Figure 6 is a view of the gate for controlling the feed of seed from the hopper.

Figure 7 shows a modified form of feeding mechanism.

Figure 8 is a plan view of Figure 7.

Figure 9 shows in section a toothed wheel 13 for picking up the seeds, a seed retaining disk 13a, and a distributing disk 15, these elements being designed to be mounted as in Figures 3 and 4.

Figure 10 illustrates a slight modification of the disk at the left of Figure 9.

Figure 11 is a fragmentary view of the seed engaging means referred to below.

In these views, the numeral 1 indicates a block having a hole therein to receive the handle forming bar 2 which extends diagonally from the block and the numeral 3 indicates a pair of brackets fastened to the block. A substantially circular casting 4 is fastened to the lower end of one of the brackets 3 and has a concavity 5 therein. A hopper 6 is fastened to the bracket which carries the member 4 and has its lower reduced end extending into the said member 4 so that the hopper is in communication with the concavity 5. A shaft 6' is rotatably supported by the brackets 3 and passes through the concavity 5 and a ground wheel 7 is fastened to the shaft so that as the device is moved, the rotary movement of the wheel will be imparted to the shaft.

A casing 8 fits over a part of the member 4 and is fastened thereto by the clamp 9. This casing is of substantially circular shape and has an opening 9' in its outer end, with a chute 10 on said outer end for directing seed through the opening into the spout 11 which carries the plow 12 at the front of its lower end so that the spout will make a furrow as the device travels along and the seed passing through the spout will drop into said furrow. A toothed wheel 13 is fastened to the shaft by the nuts 14 and a disk 15 has a hole in its center which fits loosely over the extremity of the shaft. This disk is of slightly smaller diameter than the wheel so that it fits in the space formed by the hook shaped teeth 16 formed on the periphery of the wheel. An arm 17 on the disk engages a lug 18 on the inner face of the outer wall of the casing so that the disk is held from rotary movement. A spring 19 on the inner face of the outer wall of the casing presses the disk against the wheel, and said disk is formed with a notch 20 and cutaway portion 20a for the passage of seed. A flat disk 13a to be placed against disk 13 aids in retaining the seed in position between the teeth until the discharge point is reached.

From the foregoing it will be seen that seeds placed in the hopper 6 will gravitate into the concavity 5 and from said concavity, the seeds will pass into the bottom of the casing 8. The hook shaped teeth and the periphery of the disk form pockets which pick up the seeds from the casing and carry them upwardly during the rotary movement of the wheel until the seeds reach the notched part 20 of the disk, when they will pass through said notch into the chute 10, which directs them into the spout 11 so that the seeds will drop into the furrow made by the lower end of the spout. The portion 20a is intended to eliminate extra seeds.

A gate 21 controls the passage of seed from the concavity 5 into the casing, this gate being pivoted on the shaft 6 and having a handle part 22 which extends from the casing. A grooved covering roller 23 is supported by the forked bracket 24 in rear of the spout so that the seeds are covered by this roller after they are dropped in the furrow.

Figures 7 and 8 show a toothed wheel 13' which if provided with a less number of hook shaped teeth than that shown in the other figures so that this arrangement will space the seeds farther apart, and by providing a plurality of these toothed wheels, the teeth of which vary in size and distance apart, the implement can be used for planting different kinds of seeds as well as varying the distances between the seeds.

The outer part of the casing, at one side thereof, is formed with an enlargement or extension 25 in which is placed a plate 26 pivoted at its lower end. This element 26 adapts the seed compartment to the size of the seed being used.

The modification of Figure 10 shows the edge portion of the seed aperture 20' as having a gradual inclination, compared with the abrupt edge illustrated at 20 in Figure 9. Either type may be employed as occasion may require in effecting the even distribution of the particular seed to be planted.

What I claim is:—

1. In a planter, the combination with an approximately annular element including a seed discharge portion, of a wheel mounted to rotate on the transverse axis of the annular element and including a series of teeth on the periphery of said wheel, the latter having openings constituting seed pockets between the teeth, each pocket having one straight wall radially of the wheel and an undercut wall opposite the straight wall, the undercut extending laterally below the base of the teeth, for engaging seeds until they are brought successively by the operation of the wheel to the seed discharge portion of the annular element.

2. A structure comprising the elements of claim 1, the pockets there specified being positioned between opposite flat surface portions of the wheel.

3. A structure comprising the elements of claim 1, the pockets being between opposite flat surface portions of the wheel, and a disk adjacent to the wheel and on that side of the wheel opposite the annular element, the disk aiding in retaining the seeds in position until they reach the discharge portion of the annular element.

ARTHUR T. MOBLEY.